United States Patent
Grubba

(10) Patent No.: US 10,508,714 B2
(45) Date of Patent: Dec. 17, 2019

(54) GEARED TURBOFAN ENGINE AND SUN SHAFT FOR DRIVING SUN GEAR OF PLANETARY GEARBOX

(71) Applicant: Rolls-Royce Deutschland Ltd & Co KG, Blankenfelde-Mahlow (DE)

(72) Inventor: Tomasz Grubba, Zeuthen (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 4 days.

(21) Appl. No.: 15/726,126

(22) Filed: Oct. 5, 2017

(65) Prior Publication Data
US 2018/0100563 A1      Apr. 12, 2018

(30) Foreign Application Priority Data
Oct. 6, 2016   (EP) .................... 16192649

(51) Int. Cl.
| | |
|---|---|
| F02C 7/32 | (2006.01) |
| F16H 1/28 | (2006.01) |
| F02C 7/36 | (2006.01) |
| F16C 1/02 | (2006.01) |
| F16C 3/02 | (2006.01) |

(52) U.S. Cl.
CPC ............ *F16H 1/2845* (2013.01); *F02C 7/36* (2013.01); *F16C 1/02* (2013.01); *F16C 3/02* (2013.01); *F05B 2260/40311* (2013.01)

(58) Field of Classification Search
CPC .. F16H 1/2845; F02C 7/36; F16C 3/02; F16D 3/72
See application file for complete search history.

(56) References Cited

U.S. PATENT DOCUMENTS

| | | | | |
|---|---|---|---|---|
| 5,433,674 A | * | 7/1995 | Sheridan | ............... F16H 1/2809 475/346 |
| 6,223,616 B1 | * | 5/2001 | Sheridan | ............... F16H 1/2827 184/6.12 |

(Continued)

FOREIGN PATENT DOCUMENTS

| | | |
|---|---|---|
| EP | 2568190 A2 | 3/2013 |
| JP | S5026286 U | 3/1975 |
| JP | S5026286 B1 * | 8/1975 |

OTHER PUBLICATIONS

European Search Report dated Apr. 10, 2017 for counterpart European Application No. 16192649.8.

*Primary Examiner* — Patrick H Mackey
(74) *Attorney, Agent, or Firm* — Shuttleworth & Ingersoll, PLC; Timothy J. Klima

(57) ABSTRACT

A geared turbofan engine with a sun shaft driving a sun gear of planetary gearbox. The sun shaft having a front section proximal to the gearbox and a rear section distal from the gearbox. The outer diameter of the front section of the sun shaft is smaller than the outer diameter of the rear section of the sun shaft. The front section of the sun shaft having between two and four undulant sections, wherein each undulant section having at least one axial part extending in axial direction of the sun shaft and two diaphragm parts on either side of the at least one axial part extending in radial direction outward, the at least one axial part of the undulant section having an inner diameter smaller than the outer diameter of the front section of the sun shaft.

17 Claims, 3 Drawing Sheets

(56) References Cited

U.S. PATENT DOCUMENTS

| | | | |
|---|---|---|---|
| 7,824,305 B2 | 11/2010 | Duong et al. | |
| 8,523,686 B2* | 9/2013 | Goujet | F16D 3/72 |
| | | | 464/79 |
| 8,672,801 B2* | 3/2014 | McCune | F01D 25/164 |
| | | | 475/346 |
| 8,777,793 B2* | 7/2014 | Sheridan | F01D 25/16 |
| | | | 475/160 |
| 8,858,388 B2* | 10/2014 | McCune | F01D 5/027 |
| | | | 475/331 |
| 9,835,052 B2* | 12/2017 | Schwarz | F04D 25/028 |
| 9,976,437 B2* | 5/2018 | McCune | F01D 5/027 |
| 10,094,335 B2* | 10/2018 | Ertas | F02K 3/06 |
| 10,119,465 B2* | 11/2018 | Sheridan | F02C 3/107 |
| 2010/0150702 A1* | 6/2010 | Sheridan | F01D 5/06 |
| | | | 415/170.1 |
| 2012/0077607 A1 | 3/2012 | Goujet | |
| 2016/0025003 A1* | 1/2016 | Schwarz | F01D 25/16 |
| | | | 415/69 |
| 2017/0292523 A1* | 10/2017 | Niergarth | F04D 25/06 |

\* cited by examiner

GEARED TURBOFAN ENGINE AND SUN SHAFT FOR DRIVING SUN GEAR OF PLANETARY GEARBOX

REFERENCE TO RELATED APPLICATION

This application claims priority to European Patent Application No. 16192649.8 filed on Oct. 6, 2016, the entirety of which is incorporated by reference herein.

BACKGROUND

The invention relates to a geared turbofan engine and a sun shaft for driving the sun gear of a planetary gearbox.

In geared turbofan engines—as used e.g. in aircraft engines—a fan stage is driven via a gearbox to reduce the rotational speed from the driving turbine stages. With a lower rotational speed of the fan stage the engine can operate more efficiently. The gearbox, e.g. a planetary gear box, with a sun gear and several planetary gears is subjected to large loads. The driving shaft of the gearbox, i.e. the sun shaft, requires some degree of flexibility at one end of the shaft and high stress resistance at the opposite end of the shaft, which can result in mutually contradictory design goals for the sun shaft. A sun shaft for this purpose is generally described in U.S. Pat. No. 7,824,305 B2.

SUMMARY

Therefore, geared turbofan engines providing a design balancing between design goals are required.

This is addressed by a geared turbofan engine with features as described herein.

The sun shaft for driving a sun gear of a gearbox comprises a front section proximal to the gearbox and a rear section distal from the gearbox. The outer diameter of the front section of the sun shaft is smaller than the outer diameter of the rear section of the sun shaft. Therefore, the diameter of the sun shaft in the rear section increases—at least over parts of the sun shaft—towards the distal end of the sun shaft.

The front section of the sun shaft comprises between two and four undulant sections, wherein each undulant section having at least one axial part extending in axial direction of the sun shaft and two diaphragm parts on either side of the at least one axial part extending in radial direction outward, the at least one axial part of each undulant section having an inner diameter smaller than the outer diameter of the front section of the sun shaft. This means that the at least one undulant section comprises at least one groove-like structure in the sun shaft.

The combination of the varying diameter and the undulant section provides the sun shaft with the suitable torsional stiffness and the required minimum flexibility, at the lowest weight possible.

The outer diameter of the rear section varies in the axial direction of the sun shaft. In particular, the outer diameter of the rear section increases at least partially linearly, piecewise continuous, polynomial or exponentially towards the distal end in the rear section of the sun shaft. More particularly, the outer diameter of the rear section increases at least partially with a slope angle $\alpha$ between 5° and 20°, in particular between 8° and 15°.

In a further embodiment, the part of the rear section with the varying outer diameter continues into a part with a constant outer diameter towards the distal end of the sun shaft. This might be required since the space around the sun shaft in the geared turbofan engine is limited and any sudden section changes should be avoided wherever possible in order to avoid fatigue problems due to high local stresses.

In one embodiment, the ratio of the axial length of the front section to the rear section is between 1 and 2.5, in particular between 1.7 and 2.0. Therefore, the front section is always longer.

In a further embodiment, for the at least one undulant section the ratio between the outer diameter of the front section and the inner diameter for the at least one axial part D1/D3 is at least in one section of the sun shaft between 1.1 and 1.7, in particular between 1.1 and 1.6. This defines the depth of the at least one undulant section. Since the inner diameter of the at least one axial part D3 can be different at different positions, the ratio D1/D3 can vary in the axial direction of the sun shaft.

The sun shaft can e.g. comprise two undulant sections. Each of the undulant sections can have the same inner distance (width) between the diaphragm parts. This defines a bellow-like structure.

Furthermore, the ratio between the difference between the outer diameter of the front section and the inner diameter of the at least one undulant section to the inner distance between two diaphragm parts of the at least one undulant section is $$\frac{D1-D3}{2W1} \text{ or } \frac{D1-D3}{2W2} = 0.5 \ldots 4$$

The undulant sections do not have to have the same widths. The ratio between the inner distances between two diaphragm parts of two undulant sections W2/W1 can be between 0.5 and 3.0, in particular between 1.5 and 2.5.

The wall thickness of the inner axial part of at least one undulant section is larger than the wall thickness of the outer axial part of at least one undulant section. This means, there is more material in the radial inner parts of the undulant sections. In particular, the ratio between the wall thickness of the inner axial part and the wall thickness between the outer axial part T3/T4 is greater than 0.8 and less than 2.0, in particular less than 1.7.

In a further embodiment, the sun shaft comprises at least one oil draining hole, in particular in the at least one outer axial part of undulant section.

It is also possible that in one embodiment the radially extending diaphragm part of the at least one undulant section is inclined by an angle $\beta$ of +/−10°, in particular of +/−3° against the vertical measured at the midline of the wall of the diaphragm.

The issue is also addressed by a sun shaft for driving a sun gear of a planetary gearbox, the sun shaft having a front section connectable to the gearbox and a rear section connectable to a drive train, the outer diameter of the front section of the sun shaft is smaller than the outer diameter of the rear section of the sun shaft, wherein the outer diameter of the rear section varies in the axial direction of the sun shaft, and the front section of the sun shaft having between two and four undulant sections, wherein each undulant section having at least one axial part extending in axial direction of the sun shaft and two diaphragm parts extending in radial direction, the at least one axial part of the undulant section having an inner diameter smaller than the outer diameter of front section of the sun shaft.

BRIEF DESCRIPTION OF THE DRAWINGS

Embodiments of the invention are shown in the figures, where.

DETAILED DESCRIPTION

Figure 1:
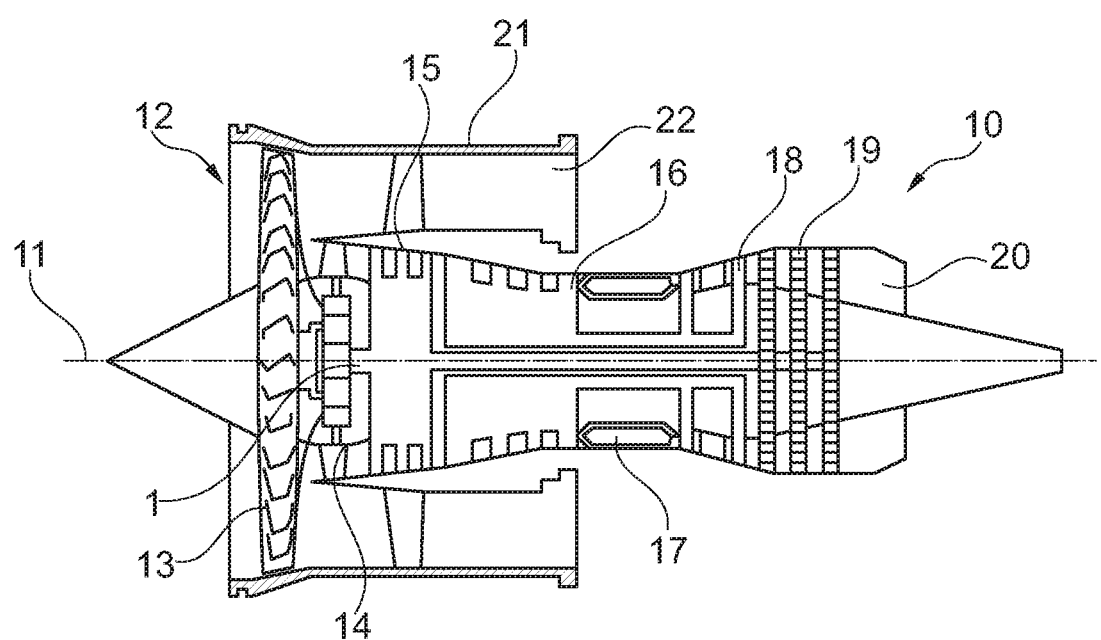
FIG. 1 shows a schematic drawing of a gas turbine engine according to the prior art.

With reference to FIG. 1, a gas turbine engine is generally indicated at 10, having a principal and rotational axis 11. The engine 10 comprises, in axial flow series, an air intake 12, a propulsive fan 13, a gearbox 14, an intermediate pressure compressor 15, a high-pressure compressor 16, a combustion equipment 17, a high-pressure turbine 18, a low-pressure turbine 19 and an exhaust nozzle 20. A fan casing 21 generally surrounds the engine 10 and defines the intake 12.

The gas turbine engine 10 works in the conventional manner so that air entering the intake 12 is accelerated by the fan 13 to produce two air flows: a first air flow into the intermediate pressure compressor 15 and a second air flow which passes through a bypass duct 22 to provide propulsive thrust. The intermediate pressure compressor 15 compresses the air flow directed into it before delivering that air to the high pressure compressor 16 where further compression takes place.

The compressed air exhausted from the high-pressure compressor 16 is directed into the combustion equipment 17 where it is mixed with fuel and the mixture combusted. The resultant hot combustion products then expand through, and thereby drive the high pressure turbine 18 and intermediate pressure turbine 19 before being exhausted through the nozzle 20 to provide additional propulsive thrust. The high pressure turbine 18 and the intermediate pressure turbine 19, respectively, drive the high pressure compressor 16 and the intermediate pressure compressor 15, each by a suitable interconnecting shaft assembly.

The intermediate pressure shaft 1 drives the propulsive fan 13 via the gearbox 14. The gearbox 14 is a reduction gearbox in that it gears down the rate of rotation of the fan 13 by comparison with the intermediate pressure compressor 15 and intermediate pressure turbine 19. Therefore, the gas turbine engine 10 is a geared turbofan engine.

In the embodiment shown here, the gearbox 14 is an epicyclic planetary gearbox having a static ring gear, rotating and orbiting planet gears supported by a planet carrier and a rotating sun gear. Since the intermediate pressure shaft 1 is connected to the sun gear of the gearbox 14, the intermediate pressure shaft is termed sun shaft 1 here. Other geared turbofan engines 10 might have a different shaft arrangement, but the sun shaft 1 is always the shaft driving the sun gear.

Figure 2:
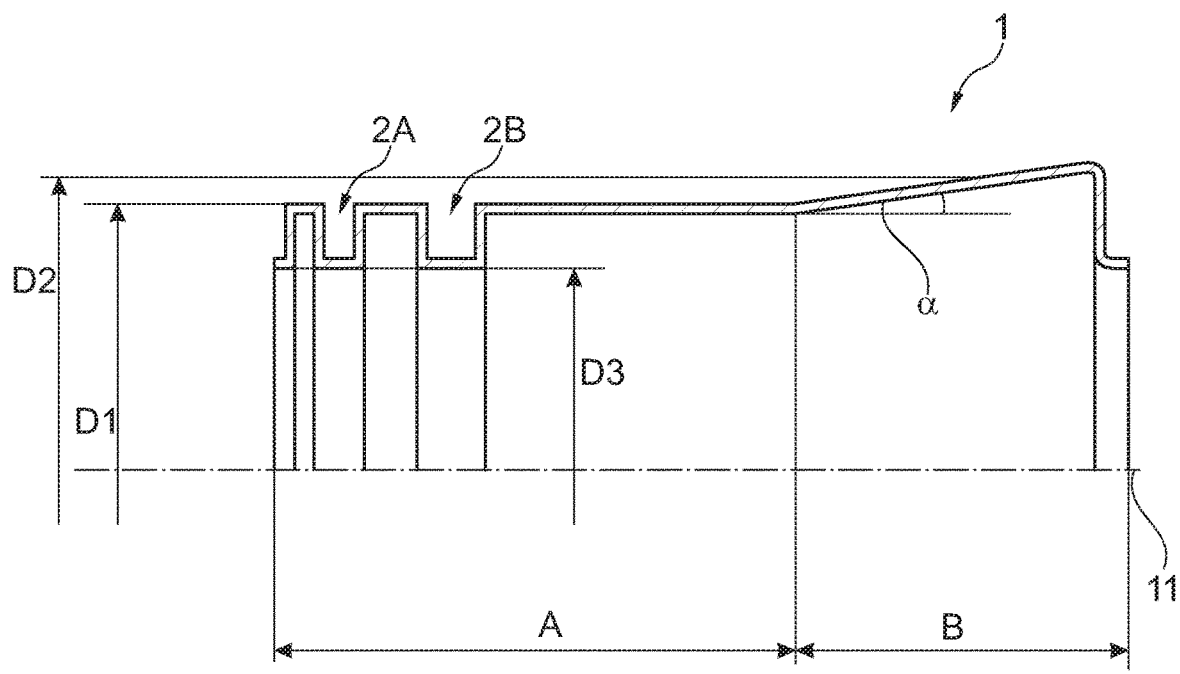
FIG. 2 shows a schematic half section of a first embodiment of a sun shaft with two undulant sections.

In FIG. 2, a half sectional view of a first embodiment of a sun shaft 1 is shown. The sun shaft comprises two sections A, B, the front section A being proximal to the gearbox 14 (not shown in FIG. 2) and the rear section B being distal to the gearbox 14. The rear section B would be connected to the turbine drive train which is not shown in FIG. 2. In operation the sun shaft 1 will drive the gearbox 14, more particular the sun gear of the gearbox 14.

It is one requirement that the sun shaft 1 is stiff in torsion and relatively flexible in bending. The latter requirement of lateral flexibility stems from the fact that the sun shaft 1 should not transfer excessive bending loads on to the gearbox 14. Therefore the sun shaft 1 should be flexible in bending as much as possible, and it should still satisfy stress condition at the torque transmission.

The embodiment of the sun shaft 1 has two features in particular:

a) The outer diameter D1 of the front section A of the sun shaft 1 is smaller than the outer diameter D2 of the rear section B of the sun shaft 1. Furthermore, in this embodiment the outer diameter D2 of the rear section B in one part increases linearly (with slope angle α) towards the distal end as seen from the gearbox 14 end, so that in any part of the rear section B the outer diameter D2 is larger than the outer diameter D1 of the front section A. Here, the outer diameter D1, D2 is understood as being the diameter of an envelope around the sun shaft 1.

b) The front section A of the sun shaft 1 comprises at least one undulant section 2A, 2B. The undulant sections 2A, 2B are understood to be parts of the sun shaft 1 in which the spatial orientation of the sun shaft's 1 wall changes at least three times, e.g. from axial to radial to axial to radial. The undulant sections 2A, 2B comprise one axial part 3, i.e. a part of the sun shaft's 1 wall extending in axial direction with a smaller inner diameter D3 than the outer diameter D1 of the front section A. The undulant sections 2A, 2B further comprise two diaphragm parts 5, 6 extending in radial direction outward from either side of the axial part 3. With these three parts 3, 4, 5 an undulant section 2A, 2B, a groove-like structure can be made (see FIG. 4). If multiple undulant sections 2A, 2B are present in axial sequence in the sun shaft 1, the resulting structure is bellow-like.

Figure 3:
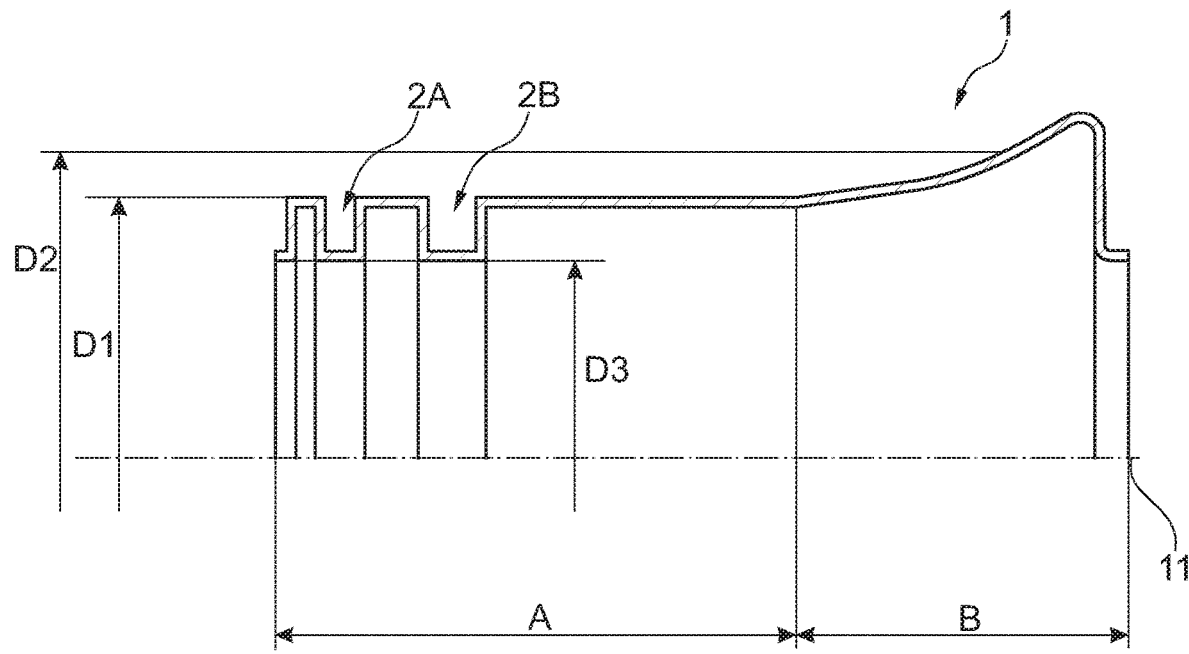
FIG. 3 shows a schematic half section of a second embodiment of a sun shaft with two undulant sections.

In FIGS. 2 and 3 the sun shaft 1 itself is shown. To the left, i.e. looking forward, the sun shaft 1 goes into a plain circular section ending with a spline as a means of connection to the sun gear of the gearbox 14 (not shown here).

In the following, specific features of embodiments of the sun shaft 1 are described. To give some perspective on the design space, the driving torque of the sun shaft 1 can be in the range of 70 to 100 kNm, in particular between 80 to 95 kNm.

Moreover, the sun shaft should see the reaction bending moment not greater than 3 kNm at the end proximal to the gearbox 14, when the other distal end is displaced laterally by 1 mm. The maximum Von Mises stress on the sun shaft 1 under the high torque only should be less than 600 MPa, in particular not greater than 550 MPa.

The ratio of the length front section A to the length of the rear section B shown in FIG. 2 is about 1.9. Other embodiments can have respective ratios between 1 and 3.

The rear section B starts when the outer diameter D2 increases beyond the outer diameter D1 of the front section A. In the embodiment shown, the increase is linear with a slope angle α of about 10°. As can be seen in FIGS. 2 and 3, the part of the varying diameter D2 continues into a part of the rear section B with a constant outer diameter D2 before the connection to the drive train (see FIG. 5).

Other embodiments (see FIG. 3) do not have to have a constant slope angle α. The embodiment in FIG. 3 has an exponentially growing outer diameter in the rear section B. The transition between the front section A and the rear section B is smooth in this embodiment. Otherwise, the embodiment in FIG. 3 is analogue to the embodiment shown in FIG. 2 so that the respective description is applicable. In other alternatives the outer diameter D2 can increase with a different function, e.g. a polynomial shape or a piecewise continuous shape.

Figure 4:
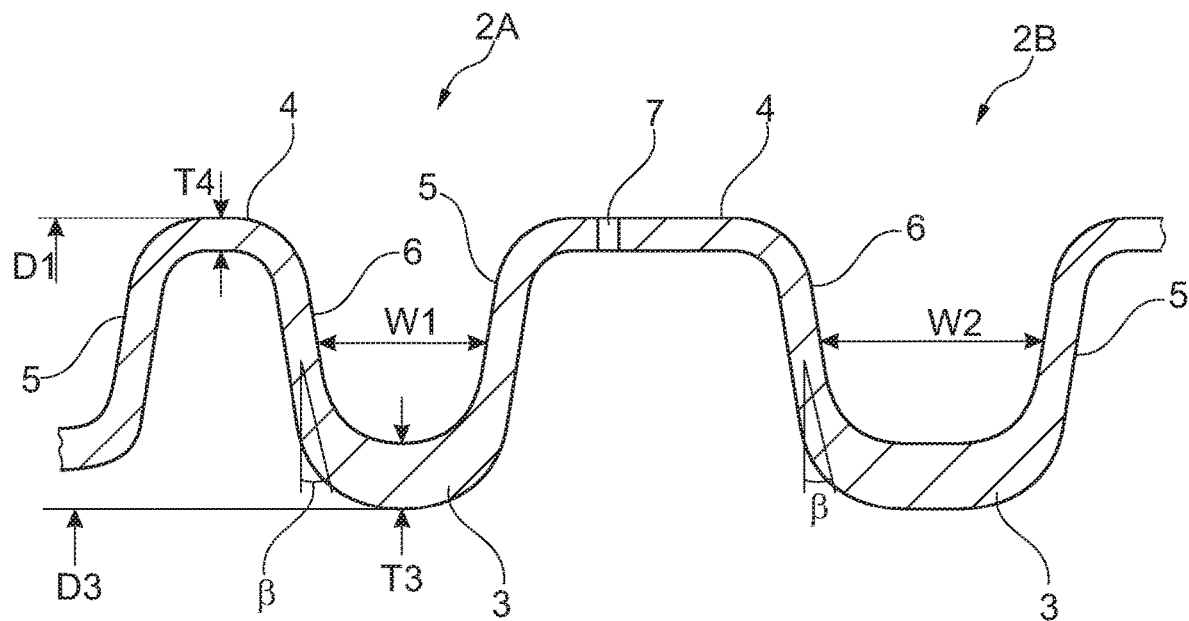
FIG. 4 shows a detail from undulant sections of a sun shaft from a front section of the sun shaft.

The part of the front section A which is closest to the gearbox 14 comprises the undulant sections 2A, 2B providing a stiff in torsion, yet light-weight end of the sun shaft 1. The details are shown in FIG. 4. In the embodiment shown here, the inner diameter D3 of the undulant sections 2A, 2B is constant. In other embodiments the inner diameter D3 can vary. This variation can be required to make room for e.g. a thrust shaft within the sun shaft 1.

The depth of the undulant sections 2A, 2B relative to the outer diameter D1 of the front section A, i.e. D1/D3, is a measure of how long (or short) the diaphragm parts 5, 6 are relative to the outer diameter D1 of the front section A. In the embodiment described here, the ratio is about 1.4. In general, the ratio can be between 1.1 and 1.7. The ratio D1/D3 does not have to be constant over the sun shaft 1 since D3 might be different in different sections of the sun shaft 1.

The aspect ratio of the undulant sections 2A, 2B is the ratio of the radial lengths of the diaphragm parts 5, 6 to the respective widths W1, W2 (i.e. the inner distance between the two parallel diaphragm parts 5, 6). As can be seen in the enlarged section in FIG. 4, the shape of the of the undulant sections 2A, 2B is relatively complex in particular due to the varying wall thicknesses T3, T4 and the different fillets. For the purpose of definition, the inner distances W1, W2 of the diaphragm parts 5, 6 are measured in the middle radial height of the undulant parts 2A, 2B. Therefore, the depth of the undulant sections (2A, 2B) is $$\frac{D1 - D3}{2}.$$

The ratio of the depth of the first undulant section 2A to the width W1 is about 0.8. The ratio of the depth of the second undulant section 2B to its width W2 is also about 0.8. Depending on the mechanical properties of the sun shaft 1 desired, the ratio can be in the range from 0.5 to 4. This is one shape parameter of a simple bellow-structure with two undulating sections 2A, 2B. It is also possible that the widths W1, W2 are different.

In the embodiment shown, the ratio between the two widths W2/W1 (i.e. the inner distances between the parallel diaphragms 5, 6 is about 1. The ratio in other embodiments can be between 0.5 and 3.

The wall thicknesses T3, T4 of the sun shaft 1 vary in the undulant sections 2A, 2B as can be seen in FIG. 4. The inner axial part 3 has a higher wall thickness T3 than the outer axial part 4 (T4<T3). The thickness of the radially extending diaphragms 5, 6 is between those of the two axial parts 3, 4. The ratio between the wall thickness T3 of the inner axial part 3 and the wall thickness between the outer axial part 4 T3/T4 is between 0.4 to 2.0, in particular between 1.0 and 1.6.

In FIG. 4 oil draining holes 7 (i.e. for oil inside the sun shaft 1) are described as an additional feature. For the sake of simplicity only one hole 7 is shown in the second undulant section 2B. In general, the oil holes 7 may be drilled in any cavity-like areas in order to enable the lubricating oil being drained outside the sun shaft 1. That means the oil draining holes can also be drilled, apart from the previously mentioned undulant sections, in vicinity of the outermost diameter D2, close to the drive train.

The holes 7 are positioned in the outer axial part 4 of the undulant sections 2A, 2B. That might result in an increase of the thickness T4 (and most likely of the thickness T5 in the axial part of the rear end of the sun shaft 1, see FIG. 5) only locally in order to improve manufacturability (drilling holes) and also to lower high local stress. In one embodiment T3 and T4 were 7.1 mm and 4.4 mm, respectively. For a design with oil draining holes 7 the thickness T4 may be slightly higher, e.g. 5.5 mm or more.

The locally increased thickness T4 may be an axisymmetric feature extending over the whole perimeter of the sun shaft or it may occur in a number of discrete equi- or non-equispaced locations e.g. bosses. Thus, the T3/T4 ratio may get smaller towards 0.8 wherever these draining holes occur.

It should be noted, that the radial extending diaphragms 5, 6 of the undulant sections 2A, 2B can be slightly inclined by an angle β (measured at the midline between +/−10° against the vertical, in particular +/−3°). It is beneficial for the lateral flexibility if they are exactly vertical. But for the reduction local stresses a slight inclination is beneficial.

Figure 5:
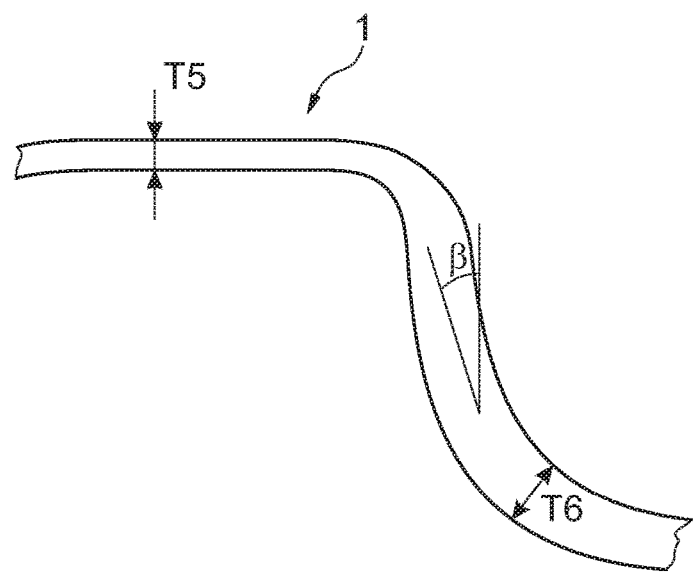
FIG. 5 shows a detail from the distal end of the sun shaft.

In FIG. 5 the distal end of the sun shaft 1 is shown. Here, the wall thickness increases towards the connection to the drive train, here at the right end. The thickness T5 at the highest diameter D2 is usually lower than the one at the bottom connection to the drive train T6 and T3 at the bottom end. In general, the ratio T3/T5 may vary in the range of 0.8 to 3.0. The sun shaft 1 may contain oil scavenging holes 7 at the top diameter D2, and then the thickness T5 may be bigger locally in order to improve local stress. The latter locally increased thickness T5 may be an axisymmetric feature extending over the whole perimeter, or it may occur in a number of discrete equi- or non-equispaced bosses. Thus, the T3/T5 ratio may get smaller towards 0.8 wherever these draining holes occur.

In FIG. 5 the inclination angle β of the radially extending wall may differ up to ±10° from the vertical direction, in particular it may be in the range of +/−3°.

Smooth transition is proposed everywhere where sudden changes of geometry sections occur; the latter might produce undesired high local stresses. Therefore, variable fillet radii are used.

LIST OF REFERENCE NUMBERS 1 sun shaft (intermediate pressure shaft)
2A first undulant section
2B second undulant section
3 inner axial part of undulant section
4 outer axial part of undulant section
5 radially extending diaphragm part of undulant section
6 radially extending diaphragm part of undulant section
7 oil draining hole
10 gas turbine engine, geared turbofan engine
11 principal rotational axis
12 air intake
13 propulsive fan
14 gearbox, power gearbox
15 intermediate pressure compressor
16 high-pressure compressor
17 combustion equipment
18 high-pressure turbine
19 low-pressure turbine
20 exhaust nozzle
21 fan casing
22 by-pass duct
A front section of sun shaft (proximal to gearbox)
B rear section of sun shaft (distal to gearbox)
D1 outer diameter of front section
D2 outer diameter of rear section D3 inner diameter of inner axial part of undulant section
T3 thickness of sun shaft wall in inner axially extending part of undulant section
T4 thickness of sun shaft wall in outer axially extending part of undulant section
T5 thickness of sun shaft wall in an axial part of the rear end of the sun shaft
T6 thickness of sun shaft wall in an essentially radial part of the rear end of the sun shaft
α angle of slope in rear section
β inclination angle of the rear radially extending diaphragm

The invention claimed is:

1. A geared turbofan engine, comprising:
a sun shaft driving a sun gear of a planetary gearbox,
the sun shaft including a front section proximal to the planetary gearbox and a rear section distal from the planetary gearbox,
wherein an outer diameter (D1) of the front section is smaller than an outer diameter (D2) of the rear section, wherein the outer diameter of the rear section varies in an axial direction of the sun shaft, and
the front section including between two and four undulant sections, wherein each of the undulant sections includes at least one inner axial part extending in the axial direction of the sun shaft and two diaphragm parts on either side of the at least one inner axial part, the two diaphragm parts each extending in a direction having a radially outward component, the at least one inner axial part including an inner diameter (D3) smaller than the outer diameter (D1) of the front section;
wherein each of the undulant sections has same inner distances (W1, W2) between the diaphragm parts;
wherein the outer diameter (D2) of the rear section increases at least partially with a slope angle between 5° and 20°.

2. The geared turbofan engine according to claim 1, wherein at least partially the outer diameter (D2) of the rear section increases at least one chosen from partially linearly, piecewise continuous, polynomial and exponentially towards a distal end in the rear section.

3. The geared turbofan engine according to claim 1, wherein a part of the rear section with the varying outer diameter (D2) continues into a part with a constant outer diameter (D2) towards a distal end of the sun shaft.

4. The geared turbofan engine according to claim 1, wherein a ratio of an axial length of the front section to the rear section is between 1.7 and 2.0.

5. The geared turbofan engine according to claim 1, wherein for each of the undulant sections, a ratio (D1/D3) between the outer diameter (D1) of the front section and the inner diameter (D3) for the at least one inner axial part is between 1.1 and 1.6.

6. The geared turbofan engine according to claim 1, wherein the sun shaft comprises two undulant sections.

7. The geared turbofan engine according to claim 1, wherein a ratio between a difference between the outer diameter (D1) of the front section and the inner diameter (D3) of at least one of the undulant sections to an inner distance (W1, W2) between two diaphragm parts of the at least one of the undulant sections is
(D1-D3)/(2 W1) or (D1-D3)/(2 W2) =0.5-4.

8. The geared turbofan engine according to claim 1, wherein a ratio (W2/W1) between inner distances (W1, W2) between two diaphragm parts of two undulant sections is between 1.5 and 2.5.

9. The geared turbofan engine according to claim 1, wherein a wall thickness (T3) of the at least one inner axial part of at least one of the undulant sections is larger than a wall thickness (T4) of an outer axial part of the at least one of the undulant sections.

10. The geared turbofan engine according to claim 9, wherein a ratio (T3/T4) between the wall thickness (T3) of the at least one inner axial part and the wall thickness of the outer axial part is greater than 0.8 and less than 1.7.

11. The geared turbofan engine according to claim 1, wherein the sun shaft comprises at least one oil draining hole in at least one outer axial part of at least one of the undulant sections.

12. The geared turbofan engine according to claim 1, wherein each of the diaphragm parts is inclined by an angle (β) of +/−10° against a vertical measured at a midline of a wall of the each of the diaphragm parts.

13. The geared turbofan engine according to claim 1, wherein each of the diaphragm parts is inclined by an angle (β) of +/−3° against a vertical measured at a midline of a wall of the each of the diaphragm parts.

14. The geared turbofan engine according to claim 1, wherein the outer diameter (D2) of the rear section increases at least partially with a slope angle between 8° and 15°.

15. A sun shaft for driving a sun gear of a planetary gearbox, comprising:
wherein the sun shaft includes a front section connectable to the planetary gearbox and a rear section connectable to a drive train,
an outer diameter (D1) of the front section being smaller than an outer diameter (D2) of the rear section, wherein the outer diameter of the rear section varies in an axial direction of the sun shaft, and
the front section including between two and four undulant sections, wherein each of the undulant sections includes at least one axial part extending in the axial direction and two diaphragm parts extending in a direction having a radially component, the at least one axial part having an inner diameter smaller than the outer diameter of the front section;
wherein each of the undulant sections has same inner distances (W1, W2) between the diaphragm parts;
wherein the outer diameter (D2) of the rear section increases at least partially with a slope angle between 5° and 20°.

16. A geared turbofan engine, comprising:
a sun shaft driving a sun gear of a planetary gearbox,
the sun shaft including a front section proximal to the planetary gearbox and a rear section distal from the planetary gearbox,
wherein an outer diameter (D1) of the front section is smaller than an outer diameter (D2) of the rear section, wherein the outer diameter of the rear section varies in an axial direction of the sun shaft, and
the front section including between two and four undulant sections, wherein each of the undulant sections includes at least one inner axial part extending in the axial direction of the sun shaft and two diaphragm parts on either side of the at least one inner axial part, the two diaphragm parts each extending in a direction having a radially outward component, the at least one inner axial part including an inner diameter (D3) smaller than the outer diameter (D1) of the front section;
wherein for each of the undulant sections, a ratio (D1/D3) between the outer diameter (D1) of the front section and the inner diameter (D3) for the at least one inner axial part is between 1.1 and 1.6.

17. A geared turbofan engine, comprising:
a sun shaft driving a sun gear of a planetary gearbox, the sun shaft including a front section proximal to the planetary gearbox and a rear section distal from the planetary gearbox, wherein an outer diameter (D1) of the front section is smaller than an outer diameter (D2) of the rear section, wherein the outer diameter of the rear section varies in an axial direction of the sun shaft, and the front section including between two and four undulant sections, wherein each of the undulant sections includes at least one inner axial part extending in the axial direction of the sun shaft and two diaphragm parts on either side of the at least one inner axial part, the two diaphragm parts each extending in a direction having a radially outward component, the at least one inner axial part including an inner diameter (D3) smaller than the outer diameter (D1) of the front section;

wherein a ratio between a difference between the outer diameter (D1) of the front section and the inner diameter (D3) of at least one of the undulant sections to an inner distance (W1, W2) between two diaphragm parts of the at least one of the undulant sections is (D1-D3)/(2 W1) or (D1-D3)/(2 W2) =0.5-4.

\* \* \* \* \*